April 29, 1969 E. J. TOMCAVAGE 3,441,879

TRANSMISSION LINE THERMAL EQUALIZER

Filed May 13, 1966

INVENTOR.
EDWARD J. TOMCAVAGE,

BY

Berman, Davidson & Berman

ATTORNEYS.

United States Patent Office 3,441,879

Patented Apr. 29, 1969

3,441,879
TRANSMISSION LINE THERMAL EQUALIZER

Edward J. Tomcavage, 83 Weston Place, Shenandoah, Pa. 17976

Filed May 13, 1966, Ser. No. 549,992
Int. Cl. H03h 5/10, 7/38
U.S. Cl. 333—28 3 Claims

ABSTRACT OF THE DISCLOSURE

A temperature-compensating signal level and impedance matching network for use in a high frequency transmission system, consisting of a temperature-responsive attenuation branch having an electrically-centered junction and a temperature-responsive phase-shift control branch connected between the centered junction and ground. Each temperature-responsive branch includes an inductor with a thermistor in shunt therewith to vary the inductive reactance of the branch with temperature. The phase-shift control branch includes a coarse temperature-responsive phase-shift portion and a fine temperature-responsive phase-shift portion, each having an air coil shunted by a thermistor.

This invention relates to high-frequency transmission lines, and more particularly to an improved temperature-compensated transmission system particularly suitable for use in community television receiving systems and providing accurate compensation for varying coaxial cable tilt or phase shift caused by temperature fluctuations as well as for differences in attenuation for different frequencies, for example, for different channel frequencies over a range covering standard television channels 2 to 13.

A main object of the invention is to provide a novel and improved high-frequency transmission system which is provided with automatic means compensating for variations in signal attenuation and cable tilt (phase shift) produced by changes in temperature, the improved system involving relatively simple components, being completely automatic in operation, and being effective to provide the required compensation over a wide range of temperature changes.

A further object of the invention is to provide an improved transmission system for high-frequency signals, such as for transmitting television signals from an antenna to a television receiver distribution point, such as in rural or other isolated areas located at a considerable distance from the nearest television transmitter, the improved system involving inexpensive components, being reliable in operation, requiring a minimum amount of maintenance, and being easy to install.

A still further object of the invention is to provide an improved transmission line thermal equalizing unit which is compact in size, which involves inexpensive and readily available components, which involves no moving parts, and which requires no adjustment after it has been placed in service.

Further objects and advantages of the invention will become apparent from the following description and claims, and from the accompanying drawing, wherein:

Figure 1:
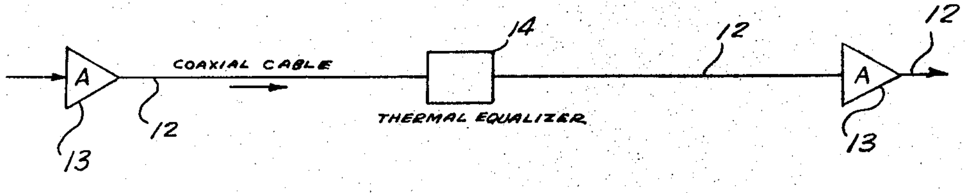
FIGURE 1 is a block diagram showing a portion of an improved high-frequency transmission line system equipped with a thermal equalizer in accordance with the present invention.

High-frequency transmission systems are generally employed in connection with the community antenna television, wherein a master antenna may be located in an elevated position relatively distant from the subscribers using the antenna. For example, the antenna may be located on a mountain top, or similar elevated location, and the community to be supplied with the television signals may be located in a valley or relatively low area situated a number of miles from the receiving antenna. A transmission system for this purpose may comprise a plurality of successive sections 12 of coaxial line between which are connected the respective broad-band amplifiers 13. The amplifiers 13 are employed to compensate for the normal attenuation in the transmission line sections and are arranged to boost the signal level at the end of each transmission line section 12 to a sufficient value to compensate for the attenuation in the preceding transmission line section.

As is pointed out in my prior U.S. Patent No. 2,775,672, issued Dec. 25, 1956, and entitled, "Coaxial Cable Temperature Signal Strength Control," the amount of attenuation which occurs in the transmission line sections varies with the temperature, whereby the performance of the transmission line fluctuates with the temperature changes, producing undesired instability and causing a wide variation in the signal to noise ratio for the television signal transmitted to the line under varying temperature conditions. In the systems previously employed, the amplifiers employed between the successive sections of a coaxial transmission line were arranged so that they could be manually adjusted in order to compensate for any changes in the attenuation of the transmission line sections to which they were connected. As pointed out in my prior patent, it is quite inconvenient to adjust such amplifiers when a sufficient change in temperature occurs to cause substantial alteration in the attenuation characteristics of the line sections because of the great distances which usually separate the amplifiers. In my aforesaid prior patent a means for automatically-adjusting the signal input level to the respective amplifiers in accordance with changes in ambient temperature is disclosed, for providing the necessary compensation for changes in the attenuation of the associated transmission line sections. In my aforesaid prior patent, temperature-responsive control units are employed which include drive mechanisms operated by temperature-responsive elements, the drive mechanisms being linked to the sliding taps of potentiometers associated with the respective amplifiers, the potentiometers having their resistance windings connected as terminations of the respective preceding transmission line sections. The arrangement provides compensation for changes in attenuation with temperature, and while being quite satisfactory for this purpose, falls short of providing total compensation, since it does not efficiently compensate for "cable tilt" or phase shift, resulting from temperature effects, particularly over the relatively wide frequency band required to cover the conventional standard television channel frequencies, namely, the frequencies ranging from that of television channel 2 to television channel 13.

In accordance with the present invention, a thermal equalizer unit, designated generally at 14, is connected between each successive pair of broad-band amplifiers 13 in the respective coaxial line sections 12. If so desired, the equalizing units 14 may be employed between every other pair of successive amplifiers 13, particularly where the amplifiers do not include automatic gain-control circuitry, for the purpose of approximating as much as possible symmetrical spacing between the amplifiers.

Figure 2:
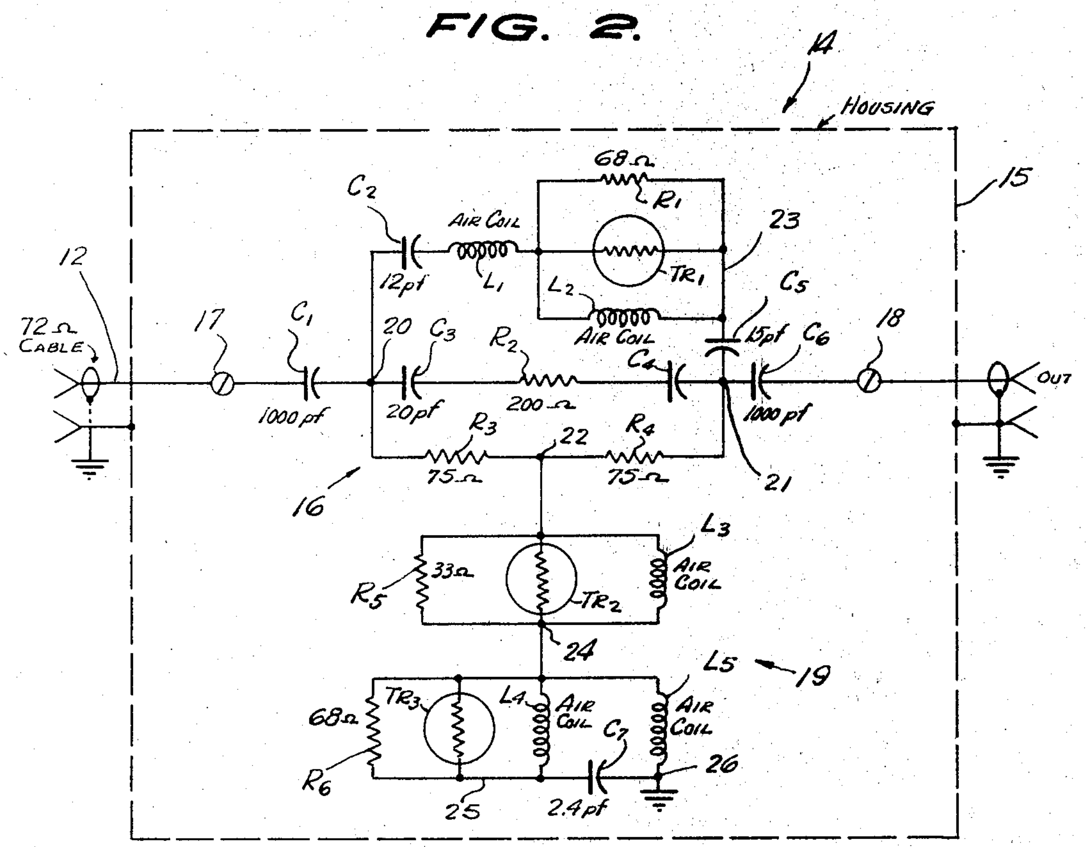
FIGURE 2 is a schematic wiring diagram showing the components and the electrical connections of the thermal equalizer employed in the system of FIGURE 1.

Referring to FIGURE 2, a typical thermal-equalizing unit 14 may comprise a suitable grounded metal housing 15 in which are suitably mounted the various electrical components of the equalizer device. The device comprises, in general, a frequency-phase shift compensating network whose various circuit branch elements are provided with temperature-responsive adjustable resistance means, presently to be described.

As shown in FIGURE 2, the circuitry of the equalizer 14 consists of a first network 16 connected between the input terminal 17 and the output terminal 18 of the device and a second network 19 connected between a portion of the aforesaid first network 16 and ground. Thus, the first network 16, which is substantially a series-parallel compensating circuit comprises an input capacitor $C_1$ connected between the input terminal 17 and a junction 20. A similar output capacitor $C_6$ is connected between another junction 21 and the output terminal 18. The capacitors $C_1$ and $C_6$ have capacitance values of approximately 1000-picofarads. Connected between the junctions 20 and 21 are three parallel branch circuits. One of said branch parallel circuits comprises the series-connected resistors $R_3$ and $R_4$ each having a resistance value of approximately 75 ohms, the series-connected resistors having a common junction 22. The second branch comprises series-connected capacitor $C_3$, resistor $R_2$ and capacitor $C_4$, as shown, the capacitors $C_3$ and $C_4$ having capacitance values of approximately 20 picofarads each and the resistor $R_2$ having a resistance value of approximately 200 ohms.

The third branch comprises the capacitor $C_2$, the coil $L_1$ and a parallel-connected branch comprising a resistor $R_1$, a thermistor $TR_1$ and a coil $L_2$ connected in parallel. Said third branch also includes a capacitor $C_5$ connected between the junction 21 and the common junction wire 23 of the branch circuit comprising resistor $R_1$, thermistor $TR_1$ and coil $L_2$. The capacitor $C_2$ has a capacitance value of approximately 12 picofarads, the capacitor $C_5$ has a capacitance value of approximately 15 picofarads, the resistor $R_1$ hs a resistance value of approximately 68 ohms, the coil $L_1$ is an air coil mounted on a form of approximately 3/16-inch in diameter, employing four turns of No. 20 A.W.G. wire, and the coil $L_2$ is a similar air coil mounted on a form of approximately 3/16-inch in diameter, employing two turns of No. 20 A.W.G. wire. The thermistor $TR_1$ is similar to Model No. FR.49 Special, manufactured by Workman Electronic Products, Inc., Sarasota, Fla. This thermistor has a resistance of approximately 100 ohms at 40° Fahrenheit and decreases in resistance with increasing temperature so that it has a resistance of approximately 12 ohms at 120° Fahrenheit.

The second main branch 19 of the thermal equalizer 14 is connected between the junction 22 and ground. The network 19 comprises a first parallel branch consisting of a resistor $R_5$, a thermistor $TR_2$ and a coil $L_3$, connected in parallel, as shown. Connected between the junction 24 of this branch and ground is a second parallel branch consisting of a resistor $R_6$, a thermistor $TR_3$, a first coil $L_4$ and a second coil $L_5$, all connected in parallel, as shown. Resistor $R_5$ has a resistance value of approximately 33 ohms, resistor $R_6$ has a resistance value of approximately 68 ohms, the thermistors $TR_2$ and $TR_3$ are identical to the thermistor $TR_1$, above-described, the coil $L_3$ is an air coil mounted on a form having a diameter of approximately 3/16-inch employing seven turns of No. 20 A.W.G. wire, the coil $L_4$ is an air coil mounted on a form of approximately 3/16-inch diameter, employing two turns of No. 20 A.W.G. wire, and the coil $L_5$ is an air coil mounted on a form of approximately 3/16-inch diameter, employing three turns of No. 20 A.W.G. wire.

It will be seen from FIGURE 2 that between the junction wire 25 of resistor $R_6$, thermistor $TR_3$ and coil $L_4$ and the grounded terminal 26 of coil $L_5$ is connected a capacitor $C_7$ having a capacitance value of approximately 2.4 picofarads.

The attenuation and phase-shift characteristics of the network would normally vary with changes in temperature. However, the effects of such changes are compensated for in the series branch 16 of the network by the provision of the thermistor $TR_1$ in parallel with the branch comprising resistance $R_1$ and coil $L_2$. Thus, the series branch 16 passes the video signals and carriers of television channels from channel 2 to channel 13 with substantially equal attenuation. By providing the thermistor $TR_2$ in parallel with resistor $R_5$ and coil $L_3$ and the thermistor $TR_3$ in parallel with the resistor $R_6$ and coil $L_4$, an approximate impedance match of 72 ohms is maintained between the input and the output of the thermal equalizer 14.

Thus, the changes in resistance of the thermistors $TR_2$ and $TR_3$ with temperature are such as to maintain an approximate impedance match between that of the coaxial cable 12 and the impedance to ground of the equalizer 14 viewed either between the therminal 17 and ground or terminal 18 and ground.

In the parallel branch 19 of the thermal equalizer the first parallel network comprising resistor $R_5$, thermistor $TR_2$ and coil $L_3$ may be considered as furnishing the major amount of temperature compensation toward maintaining the above-mentioned impedance match, whereas the second branch circuit comprising resistor $R_6$, thermistor $TR_3$, coil $L_4$, coil $L_5$ and capacitor $C_7$ may be considered as a trimmer to provide a fine degree of temperature compensation to improve the accuracy of the compensating action.

As above-mentioned, in operation, the equalizer network functions so that as the thermistor $TR_1$ changes in resistance to maintain uniform attenuation over the frequency band for television channel 2 to television channel 13, the thermistors $TR_2$ and $TR_3$ likewise change in resistance to maintain an approximate impedance match of 72 ohms between the terminals 18, 18 and ground and the respective coaxial cable sections 12, 12.

It will be noted that the thermal equalizer 14 comprises a T-type network having the input terminal 17 and the output terminal 18 and having the ground terminal at 26, with the attenuation-control branch 16 connected between the input terminal 17 and the output terminal 18, said attenuation-control branch having an electrically-centered junction at 22. The temperature-sensitive phase-shift control branch 19 is connected between said electrically-centered junction 22 and the ground terminal at 26. It will be further noted that the attenuation-control branch 16 includes a resistance-capacitance portion ($C_3$, $R_2$, $C_4$) and a capacitance-inductive portion ($C_2$, $L_1$) and the parallel-connected resistor $R_1$ and air coil $L_2$. The thermistor $TR_1$ may be connected in either the resistance-inductive portion, as shown, or in the resistance-capacitive portion, namely, either to vary the shunt resistance across one of the air coils, for instance, the air coil $L_2$, as shown, or to vary the effective resistance in the resistance-capacitive portion, for example, by being connected across the resistor $R_2$.

It will be further noted that the phase-shift control branch 19 includes the two resistance-inductive portions ($R_5$, $L_3$, and $R_6$, $L_4$, $L_5$, $C_7$) connected in series, with the thermistors $TR_2$ and $TR_3$ connected respectively across the resistors $R_5$ and $R_6$ so as to vary the effective resistances of these resistance-inductive portions with temperature. As previously mentioned, a coarse degree of compensation is provided by the first resistance-inductive portion ($R_5$, $TR_2$, $L_3$) and the additional fine degree of compensation for accurate phase-shift control is provided by the second resistance-inductive portion including the thermistor $TR_3$ connected across the resistor $R_6$.

While a specific embodiment of an improved temperature-responsive signal level control and impedance matching device for use in a high-frequency transmission system between successive amplifiers thereof to maintain substantially constant attenuation over the working frequency band and to maintain impedance matching has been disclosed in the foregoing description, it will be understood that various modifications within the spirit of the invention may occur to those skilled in the art.

What is claimed is:

1. A temperature-responsive signal level control and impedance matching device for use in a high-frequency transmission system between successive amplifiers thereof to maintain substantially constant attenuation over a wide frequency range and to prevent phase shift with temperature comprising a network having an input terminal, an output terminal and a ground terminal, an attenuation control branch connected between said input and output terminals, said attenuation control branch having an electrically centered junction, and a phase shift control branch connected between said junction and said ground terminal, wherein said phase shift control branch includes at least one parallel-connected resistance and inductance and a thermistor connected across said resistance and inductance, varying the effective impedance of the phase shift control branch with changes in temperature, and wherein said attenuation control branch includes a capacitor, an inductance and an inductance-compensating circuit connected in series, said inductance-compensating circuit comprising a coil, a resistor and a thermistor connected in parallel, the last-named thermistor acting as a variable shunt for the coil, whereby to vary the additive inductive effect of the coil on said last-named inductance and to thereby vary the inductive reactance of said attenuation control branch with changes in temperature.

2. The temperature-responsive signal level control and impedance matching device of claim 1, and wherein said phase-shift control branch includes a second temperature-responsive resistance-inductive portion of substantially lower impedance connected in series with the first-named resistance-inductive portion of the phase-shift control branch and acting as a trimmer for the first-named resistance-inductive portion of the phase-shift control branch.

3. The temperature-responsive signal level control and impedance matching device of claim 2, and wherein said second temperature-responsive resistance-inductive portion comprises an air inductor of relatively few turns, a resistor connected across said last-named air inductor, a thermistor connected across said last-named air inductor and resistor, acting as a variable shunt for the air inductor to vary the additive inductive effect of the air inductor on the first-named resistance-inductive portion with temperature and to thereby provide fine variation of the inductive reactance of the phase-shift control branch with changes in temperature in addition to the relatively coarse impedance variations provided by the first-named thermistor of the phase-shift control branch.

References Cited

UNITED STATES PATENTS 3,173,110 3/1965 Albersheim ------ 330—143 X

HERMAN KARL SAALBACH, *Primary Examiner.*

P. L. GENSLER, *Assistant Examiner.*

U.S. Cl. X.R.

330—143; 333—32